US009038458B2

(12) United States Patent
Becker et al.

(10) Patent No.: US 9,038,458 B2
(45) Date of Patent: May 26, 2015

(54) MONITORING DEVICE FOR REPAIR PATCHES, REPAIR KIT, AND METHOD FOR MONITORING A REPAIR PATCH

(75) Inventors: Thomas Becker, Osterholz-Scharmbeck (DE); Ulrich Prechtel, Munich (DE); Jirka Klaue, Ottobrunn (DE); Martin Kluge, Konigsbrunn (DE); Jordi Sabater, Munich (DE); Josef Schalk, Altheim (DE)

(73) Assignee: EADS DEUTSCHLAND GmbH, Ottobrunn (DE)

( * ) Notice: Subject to any disclaimer, the term of this patent is extended or adjusted under 35 U.S.C. 154(b) by 0 days.

(21) Appl. No.: 13/811,635

(22) PCT Filed: Jul. 14, 2011

(86) PCT No.: PCT/EP2011/062075
§ 371 (c)(1),
(2), (4) Date: Mar. 28, 2013

(87) PCT Pub. No.: WO2012/010496
PCT Pub. Date: Jan. 26, 2012

(65) Prior Publication Data
US 2013/0192381 A1 Aug. 1, 2013

(30) Foreign Application Priority Data
Jul. 23, 2010 (DE) .......................... 10 2010 032 093

(51) Int. Cl.
G01M 5/00 (2006.01)
G01M 17/00 (2006.01)
(Continued)

(52) U.S. Cl.
CPC ............... *G01M 17/00* (2013.01); *B29C 73/10* (2013.01); *B64C 2001/0072* (2013.01);
(Continued)

(58) Field of Classification Search
CPC ............ G01M 5/0033; G01M 5/0041; G01M 5/0016; B64F 5/0045
USPC ............................................ 73/802, 499, 799
See application file for complete search history.

(56) References Cited

U.S. PATENT DOCUMENTS 4,510,803 A * 4/1985 Perara .......................... 73/178 R
6,278,913 B1 * 8/2001 Jiang ................................. 701/3
(Continued)

FOREIGN PATENT DOCUMENTS

DE 10 2007 055 090 A 5/2009
DE 102007055090 * 5/2009 ............. B64D 45/00
WO 2009/062635 A1 5/2009

OTHER PUBLICATIONS

International Search Report of corresponding International Application No. PCT/EP2011/062075, dated on Dec. 23, 2011.
(Continued)

Primary Examiner — Eric S McCall
Assistant Examiner — Anthony W Megna Fuentes
(74) Attorney, Agent, or Firm — Global IP Counselors, LLP

(57) ABSTRACT

A monitoring device for a repair patch that can be placed on or in a wall of an aircraft to repair a defect has a sensor device for detecting properties of the repair patch placed in the wall, an energy supply device for supplying energy at least to the sensor device, and a communication device so as to read out the sensor data. A repair kit that can be placed in or on a wall of an aircraft to repair defects comprises a repair patch for repairing a defect in or on a wall of an aircraft and also comprises a monitoring device. A method for monitoring a repair patch in or on a wall of an aircraft by means of a monitoring device comprises the steps of detecting a measurement phase on the basis of the amount of energy provided by the energy supply device, measuring load parameters in and/or on the repair patch during the measurement phase, and reading out the load parameters.

19 Claims, 4 Drawing Sheets

(51) Int. Cl.
    *B29C 73/10*     (2006.01)
    *B64D 43/00*     (2006.01)
    *B64F 5/00*     (2006.01)
    *G01L 1/10*     (2006.01)
    *B64C 1/00*     (2006.01)
    *B64D 45/00*     (2006.01)

(52) U.S. Cl.
    CPC ....... *B64D 43/00* (2013.01); *B64D 2045/0085* (2013.01); *B64F 5/0045* (2013.01); *B64F 5/0081* (2013.01); *G01M 5/0041* (2013.01); *Y02T 50/433* (2013.01)

(56) References Cited

U.S. PATENT DOCUMENTS

| | | | |
|---|---|---|---|
| 7,398,698 B2 * | 7/2008 | Griess et al. ............... 73/801 |
| 2007/0100582 A1 | 5/2007 | Griess et al. |
| 2007/0204699 A1 | 9/2007 | Salvo et al. |

OTHER PUBLICATIONS

German Office Action of corresponding German Patent Application No. 10 2010 032 093.5-22, dated on Apr. 18, 2011.

Galea, S. et al.: Development of structural health monitoring systems for composite bonded repairs on aircraft structures, Proc. SPIE 4327, 246 (2001); doi: 10.1117/12.436536, URL: http://dx.doi.org/10.1117/12.436536, Apr. 5, 2011.

Fraunhofer IPM: EADS-Konsortium entiwickelt energieautarke Sensoren, airliners.de, Oct. 22, 2009, URL: http://www.airliners.de/technik/forschungundetwicklung/eads-konsortium-entwickelt-energieautarke-sensoren/19418, Apr. 5, 2011.

Maier, A., Dr. Benassi, L, Stolz, C.: Structural Health Monitoring of Repairs, NATO Research and Technology Organization, RTO-EN-AVT-156 Battle Damage Repair Techniques and Procedures on Air Vehicles—Lessons Learned and Prospects, May 2010, URL: http://www.rta.nato.int/pubs/rdp.asp?RDP=RTO-EN-AVT-156, Apr. 5, 2011.

* cited by examiner

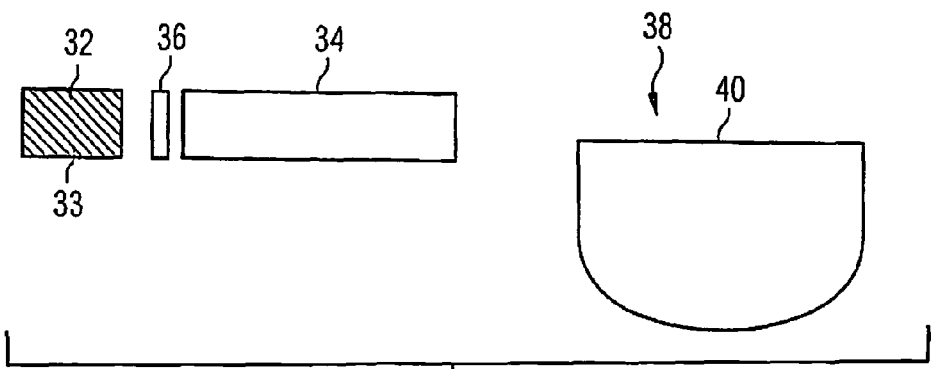
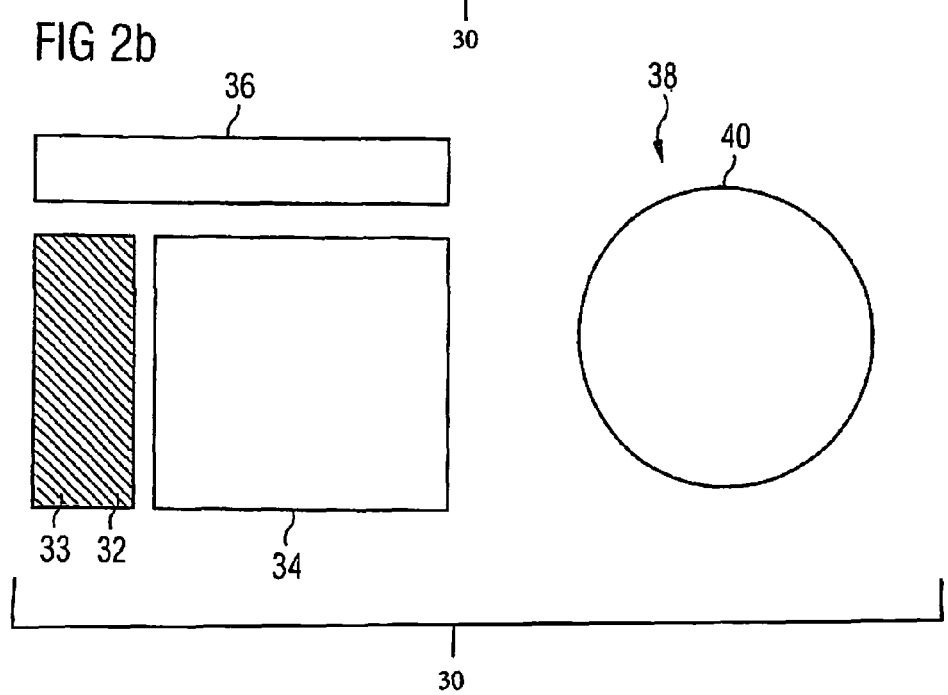

MONITORING DEVICE FOR REPAIR PATCHES, REPAIR KIT, AND METHOD FOR MONITORING A REPAIR PATCH

CROSS-REFERENCE TO RELATED APPLICATIONS

This U.S. National stage application claims priority under 35 U.S.C. §119(a) to German Patent Application No. 10 2010 032 093.5, filed in Germany on Jul. 23, 2010, the entire contents of German Patent Application No. 10 2010 032 093.5 are hereby incorporated herein by reference.

BACKGROUND

1. Field of the Invention

The present invention relates to a monitoring device for a repair patch that can be placed on or in a wall of an aircraft to repair a defect and has a sensor device for detecting properties of the repair patch. The present invention further relates to a repair kit, comprising a repair patch, that can be placed in or on a wall of an aircraft to repair defects. The present invention also relates to a method for monitoring a repair patch in or on a wall of an aircraft by means of a monitoring device.

2. Background Information

Defects in walls of aircraft can be caused by a large number of events, for example by small collisions with supply vehicles on the ground or with birds in the sky. Shifting cargo may also damage walls within the aircraft.

Various repair methods are known depending on the material used in the damaged wall. A repair patch (doubler) is often placed over the defect in the form of a covering. Inter alia, the repair patch should prevent the point of defect from increasing in size and should seal said point where necessary so as to prevent the infiltration of dirt and moisture.

Like any material that is exposed to mechanical load, the repair patches used are subject to wear.

SUMMARY

The object of the invention is to create a device and a method that allow the load on such repair patches to be monitored. In addition, a repair kit is to be provided that simplifies the use of the device and of the method.

To solve this problem, a monitoring device for a repair patch that can be used on or in a wall of an aircraft to repair a defect is proposed, said monitoring device comprising a sensor device to detect properties of the repair patch placed in the wall, an energy supply device for supplying energy at least to the sensor device, and a communication device for allowing the sensor data to be read out.

The monitoring device according to the invention makes it possible, on the basis of the measured properties of the repair patch, to detect the mechanical load of said patch as well as any overloading and signs of wear.

The energy supply device advantageously has a thermoelectric generator. The difference in temperature between the outer side of the aircraft and the inner side of the aircraft can thus be used for energy production. An infrastructure for supplying energy to the monitoring device is therefore no longer necessary in or on the aircraft. This wear-free energy production additionally allows a long service life of the monitoring device. In addition, the energy supply is maintenance-free, since there is no need to replace a used energy storage device.

The energy supply device may have a heat storage device for the thermoelectric generator. Energy can thus also be produced at points at which the thermoelectric generator has no contact with an inner side that is heating up. As soon as the aircraft changes altitude, a difference in temperature is produced between the outer side and the heat storage device and can be used by the thermoelectric generator for energy production.

A data storage device may be provided to store the sensor data. It is thus possible to buffer the sensor data and to read it out at a suitable moment in time. It is thus unnecessary to provide an infrastructure in the aircraft to read out the sensor data and to process or store this data in the aircraft. Aircrafts in which there is no suitable communication infrastructure provided can therefore also be fitted with such a monitoring device.

The communication device may advantageously be configured for wireless communication. It is therefore no longer necessary to provide electrical connections on the monitoring device, that in turn would have to be accessible in order to read out sensor data, this only being possible by means of very complex measures at a repair point under consideration of harmful environmental influences.

A data processing device can be provided to process the sensor data. The data processing device may perform a large number of tasks in terms of the coordination of the devices. It can preprocess the sensor data and can determine a measurement phase that is of interest for the measurement.

The data processing device is advantageously configured in such a way that the energy output of the energy supply device is monitored in order to detect a measurement phase and, on the basis of the information concerning the energy output, a desired flight phase is identified. In particular with use of a thermoelectric generator in the energy supply device, it is possible to determine the current flight phase of the aircraft on the basis of the energy output of this generator. Certain flight phases that are of particular interest in terms of the load on the repair patch can thus trigger a measurement phase.

The data processing device can compress the sensor data for storage in the data storage device. The data storage device may thus be relatively small, and a smaller bandwidth is necessary for the data transfer during readout.

The sensor device is advantageously configured to ascertain a mechanical stress. By measuring the mechanical stress, it is possible to check, inter alia, whether the state of the point of defect has worsened further.

The communication device can advantageously be supplied via an external energy source. The outlay necessary for the readout process is thus reduced since there is no need for a further energy supply to operate the congregation device.

The wall is advantageously an outer wall of the aircraft. The outer wall is one of the most important structural parts of an aircraft, and therefore the monitoring of repair points is given special priority in this instance.

The object is also achieved by a repair kit that can be placed in or on a wall of an aircraft to repair defects, said repair kit comprising a repair patch for repairing a defect in or on a wall of an aircraft and also comprising such a monitoring device.

As a result of such a repair kit, all individual parts required for assembly of a repair patch that can be monitored are available immediately in the event of a repair.

The object is also achieved by a method for monitoring a repair patch in or on a wall of an aircraft by means of such a monitoring device, said method comprising the following steps: detecting a measurement phase on the basis of the amount of energy provided by the energy supply; measuring load parameters in and/or on the repair patch during the measurement phase; reading out the load parameters.

The method according to the invention makes it possible to measure the load of the repair patch during parts of the flight that are of particular interest. Depending on the embodiment of the energy supply device, the amount of energy provided depends for example on the current flight phase.

A flight phase during which the aircraft reaches cruising altitude is advantageously provided as a measurement phase. In this phase it is possible to monitor how the repair patch behaves as its load changes as well as the type of load to which the repair patch is exposed at cruising altitude.

The measured load parameters may be stored initially in the data storage device and then read out later. This makes it possible to first buffer the sensor data during the flight and to then evaluate said data on the ground. There is thus no need in the aircraft for further infrastructure for data storage and data transfer.

BRIEF DESCRIPTION OF THE DRAWINGS

The invention will be described in greater detail hereinafter on the basis of drawings, which schematically illustrate the invention and in which, more specifically:

FIG. 1b shows a side view of the structure of the repair patch from FIG. 1a;

FIG. 2a shows a side view of the structure of an embodiment of the monitoring device;

FIG. 2b shows a plan view of the monitoring device from FIG. 2a;

FIG. 3 shows a block diagram of the monitoring device from FIG. 2a;

DETAILED DESCRIPTION OF EMBODIMENTS

Figure 1A:
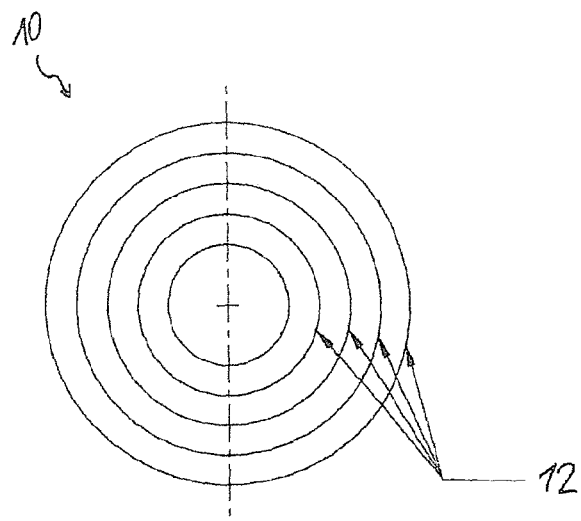
FIG. 1a shows a plan view of a repair patch for repairing a defect in a composite material.
Figure 1B:
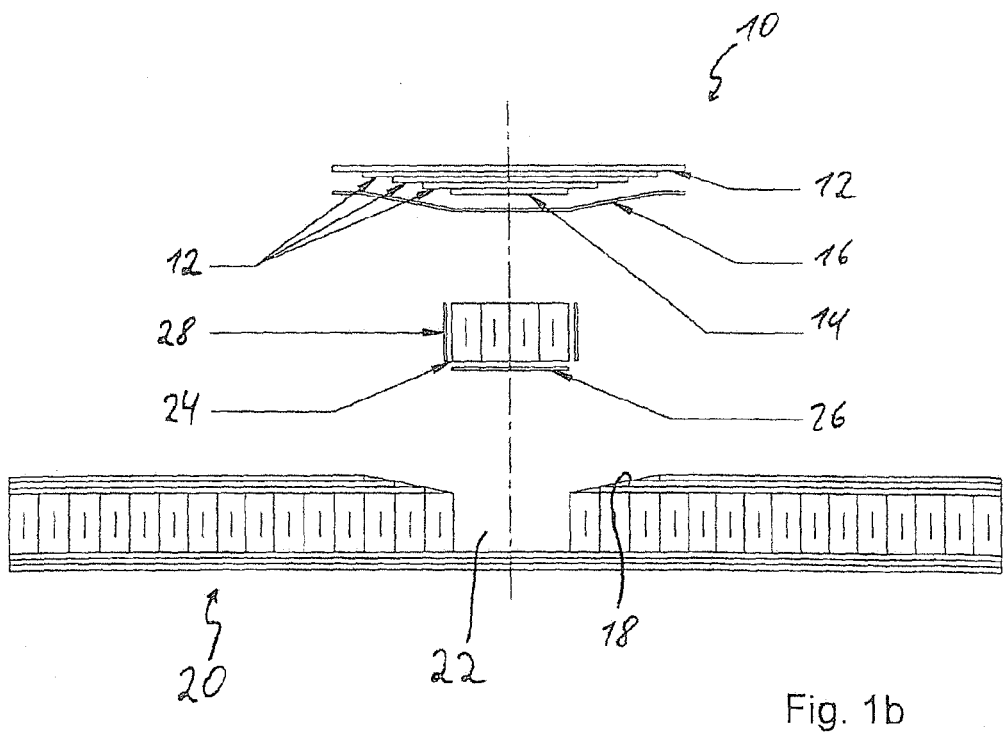

Multi-layered repair patches 10, as are shown in FIGS. 1a and 1b, are used to repair damaged outer walls of aircraft. The repair patches 10 shown are intended for the repair of composite materials, although similar superstructures exist both for metal and for carbon fiber composite materials.

A plurality of layers 12 of a repair material are arranged concentrically on top of one another. Where necessary, a filler layer 14 is provided. An adhesive film 16 connects the layers 12, 14 to one another and to a surface 18 of a composite material 20. So as to fill an opening 22 in the composite material 20, a stopper 24 is provided, which is fastened in the opening 22 by means of an adhesive film 26 and a foaming adhesive 28.

A monitoring device 30 shown in FIGS. 2a and 2b has an antenna device 33 as a communication device 32, an electronic system 34, and a strain gauge 36 as a sensor device. A thermoelectric generator 38 is provided as an energy supply device and has a heat storage device configured as a reservoir 40.

The strain gauge 36 is arranged such that it measures a mechanical strain of the repair patch 10. The mechanical load on the repair patch 10 can be calculated from the measured values from the known material parameters of the repair patch 10.

If the altitude of the aircraft on which the monitoring device 30 is placed changes, the outside temperature at the aircraft thus changes. In this case parts of the aircraft, such as its outside skin, bring their temperature in line with the outside temperature relatively quickly. By contrast, the reservoir 40 requires a relatively long period of time to match its temperature to the temperature of the surrounding environment.

The thermoelectric generator 38 is in contact both with the outside skin and with the reservoir 40 and, from the difference in temperature between these two points, generates a voltage, on the basis of which energy can be produced from the temperature difference. The electronic system 34 is supplied from this energy so that the measurements at the strain gauge 36 can be taken.

Figure 3:
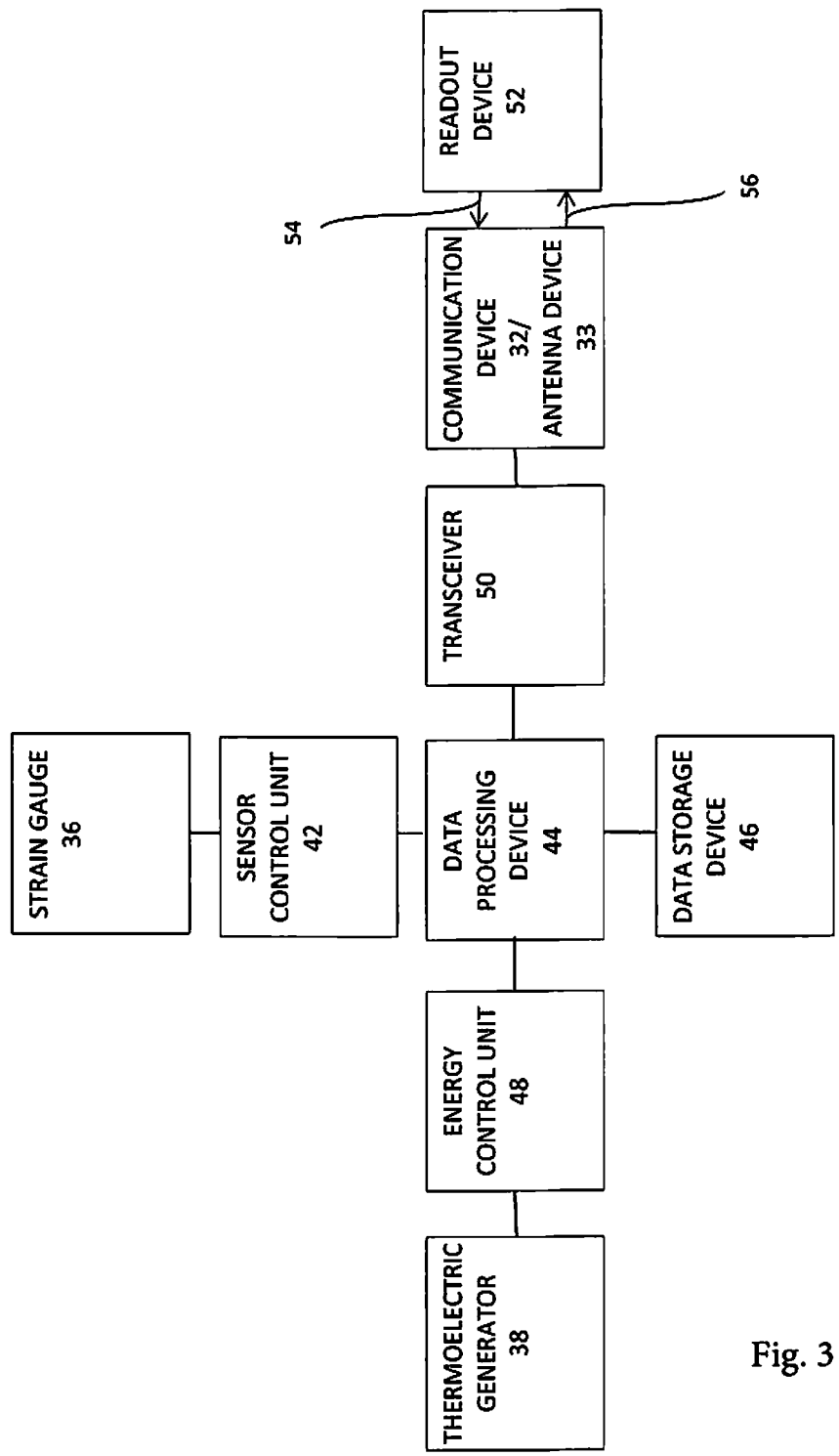

As shown in FIG. 3, the electronic system 34 has a sensor actuator 42, a data processing device 44, a data storage device 46, an energy control unit 48, and a transceiver 50.

The data processing device 44 monitors the energy output of the thermoelectric generator 38 by means of the energy control unit 48. If the energy output of the thermoelectric generator 38 corresponds to a previously determined value, for example if it lies above a threshold value, the data processing device 44 thus initiates, via the sensor control unit 42, the process of taking a measurement from the strain gauge 36. The sensor data established during this measurement process is preprocessed by the data processing device 44 and compressed and then deposited in the data storage device 46.

Later, when the aircraft is back on the ground, the sensor data is read out again from the data storage device 46. A readout device 52 communicates for this purpose with the antenna device 33 in the manner of an RFID. The antenna device 33 will thus transfer energy 54, which is used by the transceiver 50 and the data processing device 44 to read out the sensor data from the data storage device 46. The data 56 is then transferred to the readout device 52 by means of load modulation.

Figure 4:
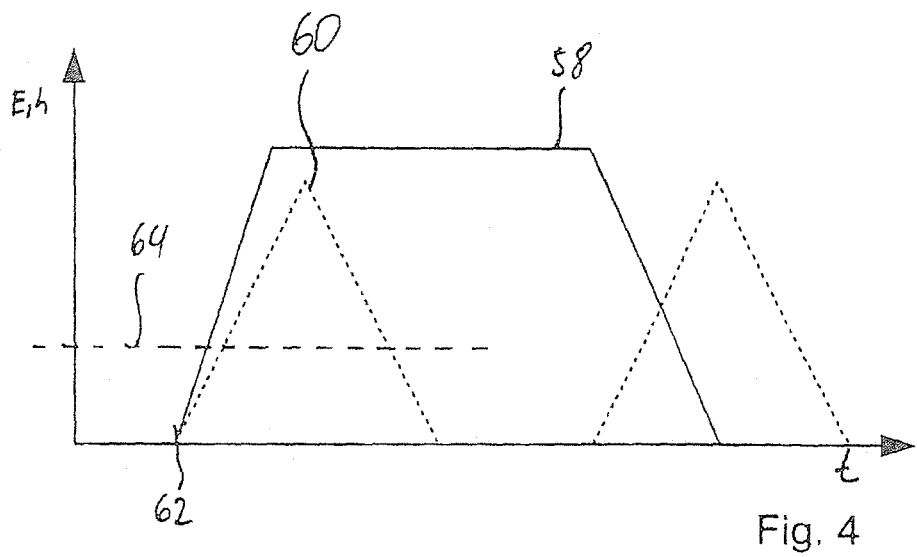
FIG. 4 shows a graph comparing the flight phase and the energy produced by an energy supply device.

FIG. 4 shows a typical altitude and energy profile of a flight of the aircraft. The altitude profile 58 shows the altitude h over time t. The energy profile 60 indicated by the dashed line shows how much energy E the thermoelectric generator 38 can deliver over time t.

From the moment of takeoff 62 of the aircraft, the altitude h initially increases continuously until the aircraft has reached the cruising altitude. Due to the difference in temperature between the outside skin and the reservoir 40, the energy E that can be supplied by the thermoelectric generator 38 initially increases with the altitude h. Once the cruising altitude has been reached, the temperature of the reservoir 40 slowly assimilates to the outside temperature, so that the energy E that can be supplied by the thermoelectric generator 38 decreases again.

Once a threshold value 64 has been reached, which marks the start of the measurement phase, the data processing device 44 starts to record sensor data. The strain on the repair patch 10 as the aircraft climbs is thus recorded. Once the cruising altitude has been reached, the available energy E decreases again, until it falls below the threshold value 64. At this moment the data processing device 44 terminates the measurement phase and therefore the recording of sensor data.

Figure 5:
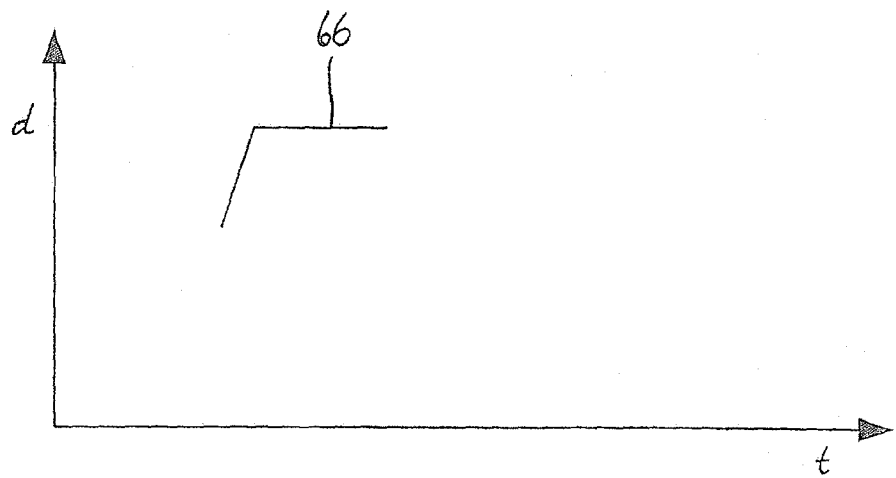
FIG. 5 shows a graph of a load measurement taken by the sensor device.

The result of such a measurement phase is shown by way of example in FIG. 5. The strain d has been recorded over time t so that a load profile 66 is produced.

The sensor device is in this case formed by a strain gauge 36. The type of sensor device used as well as the orientation thereof in space are independent of the rest of the components of the monitoring device 30. The sensor device can be arranged both perpendicular and parallel to the orientation of a point of defect and can thus measure the mechanical stress in different directions. It is also possible for the sensor device to be configured to measure a pressure, a temperature, or other properties of the repair patch 10.

The communication device 32 may also be configured for acoustic data transmission, for example by means of structure-borne sound, irrespective of the other components of the monitoring device 30. A piezoelement may be used in this case to generate energy in the communication device 32.

If the data is transferred from and to the antenna device 33 by means of electromagnetic fields, a low frequency is preferably used, in particular below 1 kHz. Such low-frequency electromagnetic fields can also penetrate walls having a metal content.

The repair patches 30 can thus be monitored during the flight in terms of their stress, strain and load.

A strain sensor and electronic system are located on a repair patch 10 within the aircraft. The strain is measured at least once per flight at maximum operating altitude. The measurement normally lasts 10 to 30 seconds. The electronic system 34 has a data storage device 46 for recording the maximum strain and the respective time.

The monitoring device 30 has a service life of up to 20 years. The data stored in the data store can be read out wirelessly by means of a portable readout device 52.

The energy for the strain measurement and the recording of the data is provided by a thermoelectric generator 38, which is connected on one side to the outside skin of the aircraft and on the other side to a reservoir 40, which is used as a heat and/or cold store and has a phase-change material.

The thermoelectric generator 38, together with the reservoir 40 and on the basis of its asynchronous and non-linear operating principle, then generates energy precisely when the measurements have to be carried out, and therefore the energy supply module may act as an altimeter and as a trigger for the measurement. There is thus no need for additional modules for these tasks, which saves energy and circuits.

In this embodiment, conventional strain gauges are used for the measurement, wherein gauges of high resistance due to their low energy consumption are preferred. Other types of sensors may also be used, irrespective of the further embodiment of the monitoring device 10.

The signal is recorded by means of a sensor interface electronic system (sensor control unit 42), which is controlled by a microcontroller (data processing device 44).

The microcontroller preprocesses the signal and also compresses and stores the data. The data store can be integrated in the microcontroller and can also be constructed separately from any suitable non-volatile memory.

The data is read out by a portable device or another device by means of low-frequency electromagnetic fields (<1 kHz, depending on the material), which in any case penetrate the metal skin of the aircraft and the repair patch.

The electromagnetic fields are also used to supply energy to the transceiver 50.

The data is transferred by modulation of the electromagnetic fields emitted from the portable device (load modulation).

In a further embodiment the data readout and the energy transfer may also take place acoustically (as with a stethoscope).

A readout device can be fastened to the structure of the aircraft either manually or by means of a suction cup if a longer period of data transfer or charging is required.

A typical flight profile can be seen in FIG. 4. The dashed line shows the energy generated by the energy supply device 38. The amount of energy E generated by the energy supply device 38 reaches its maximum shortly after the aircraft has reached its cruising altitude. This region is used as a trigger for the load measurement.

An example of such a load measurement is shown in FIG. 5.

The monitoring device 30 has a very long service life due to the wear-free energy production.

A medium may be provided in the reservoir that changes phase if the temperature range is exceeded, such that the reservoir responds particularly slowly to temperature fluctuations. The energy supply device based on a phase change then supplies the energy precisely when it is needed for the measurement. An altimeter is not needed to switch on the sensor device.

The use of low frequencies to read out the sensor data allows readout through metal surfaces (metal or carbon composite materials).

The measurement data can also be transferred by means of acoustic communication. It is also possible to transfer the energy by means of acoustic waves.

The invention makes it possible to measure, with low outlay, operating parameters of a repair patch on an aircraft, wherein the devices used have a long service life.

The invention claimed is:

1. A monitoring device for a repair patch configured for placement on or in a wall of an aircraft to repair a defect, the monitoring device comprising:
   a sensor that is disposed in contact with or adjacent to the repair patch, the sensor being configured to detect properties of the repair patch that is placed on or in the wall and provide sensor data;
   an energy supply device configured to supply energy at least to the sensor device;
   a communication device configured to read out the sensor data; and
   a data processing device configured to monitor the energy output of the energy supply device to identify a predetermined flight phase of the aircraft based on the energy output and to perform a measurement operation during which the data processing device records the sensor data during the predetermined flight phase.

2. The monitoring device as claimed in claim 1, wherein the energy supply device includes a thermoelectric generator.

3. The monitoring device as claimed in claim 2, wherein the thermoelectric generator includes a heat storage device.

4. The monitoring device as claimed in claim 1, further comprising a data storage device configured to store the sensor data.

5. The monitoring device as claimed in claim 1, wherein the communication device is configured for wireless communication.

6. The monitoring device as claimed in claim 1, wherein the data processing device is configured to process the sensor data.

7. The monitoring device as claimed in claim 6, wherein the data processing device is configured to process the sensor data by compressing the sensor data for storage in a data storage device.

8. The monitoring device as claimed claim 1, wherein the sensor device is configured to ascertain a mechanical stress as one of the properties.

9. The monitoring device as claimed in claim 1, wherein the communication device is supplied via an external energy source.

10. The monitoring device as claimed in claim 1, wherein the wall is an outer wall of the aircraft and the sensor device is configured to detect the properties of the repair patch placed on or in the outer wall.

11. A repair kit comprising the repair patch and the monitoring device as claimed in claim 1.

12. A method for monitoring a repair patch in or on a wall of an aircraft by using a monitoring device as claimed in claim 1, the method comprising:
  detecting a measurement phase on the basis of the amount of energy provided by the energy supply device;
  measuring load parameters at least one of in and on the repair patch during the measurement phase; and
  reading out the load parameters.

13. The method as claimed in claim 12, wherein the measurement phase is present during a flight phase during which the aircraft reaches a cruising altitude.

14. The method as claimed in claim 12, further comprising storing the measured load parameters initially in a data storage device for reading out during a reading out operation at a later time.

15. The monitoring device as claimed in claim 2, further comprising a data storage device configured to store the sensor data.

16. The monitoring device as claimed in claim 2, wherein the communication device is configured for wireless communication.

17. The monitoring device as claimed in claim 2, wherein the data processing device is configured to process the sensor data.

18. The monitoring device as claimed in claim 2, wherein the sensor device is configured to ascertain a mechanical stress as one of the properties.

19. The monitoring device as claimed in claim 1, wherein the data processing device is configured to refrain from recording the sensor data during a flight phase of the aircraft other than the predetermined flight phase.

* * * * *